United States Patent [19]

Obermann et al.

[11] Patent Number: 4,581,941
[45] Date of Patent: Apr. 15, 1986

[54] COMBINED ELECTRONIC PRESSURE TRANSDUCER AND POWER SWITCH

[75] Inventors: George Obermann, Niles; Lui M. Lee, Melrose Park, both of Ill.

[73] Assignee: Controls Company of America, Schiller Park, Ill.

[21] Appl. No.: 713,167

[22] Filed: Mar. 18, 1985

[51] Int. Cl.⁴ .............................................. G01L 9/10
[52] U.S. Cl. ........................................ 73/728; 73/115; 200/83 J; 336/30; 338/32 H
[58] Field of Search ................ 73/728, 722, 115; 336/30; 200/83 J; 307/118; 338/32 H

[56] References Cited

U.S. PATENT DOCUMENTS

| | | | |
|---|---|---|---|
| 4,192,191 | 3/1980 | Nelson | 73/728 |
| 4,326,419 | 4/1982 | Herden | 73/728 |
| 4,343,180 | 8/1982 | Herden et al. | 73/717 |
| 4,430,900 | 2/1984 | Valbjorn | 73/701 |
| 4,484,173 | 11/1984 | Everett | 338/42 |

FOREIGN PATENT DOCUMENTS 2936579  12/1981  Fed. Rep. of Germany ........ 73/728

Primary Examiner—Donald O. Woodiel
Attorney, Agent, or Firm—David L. Davis; Robert E. Smith; Edward L. Bell

[57] ABSTRACT

A pressure switch and transducer arrangement combines into a single unit both a power contact switch for providing power to an automobile fuel pump in response to a predetermined minimum oil pressure and a magnet/Hall effect sensor for providing an analog signal indicative of the oil pressure for use by the automobile on-board microcomputer. The arrangement includes an actuator rod movable by a diaphragm in response to oil pressure. The end of the rod remote from the diaphragm is coupled to a contact washer for providing the power switching function and also to a magnet which cooperates with a fixed Hall effect sensor, which sensor provides an output corresponding to the air gap between the magnet and the sensor. The magnet and the washer are coupled to the actuator rod in such a manner that even after the washer makes contact with the power switching terminals, the actuator rod and magnet are free to continue moving as the oil pressure continues to increase.

7 Claims, 6 Drawing Figures

COMBINED ELECTRONIC PRESSURE TRANSDUCER AND POWER SWITCH

DESCRIPTION

Background of the Invention

This invention relates to pressure measuring apparatus and, more particularly, to such apparatus which provides both a switching function at a predetermined pressure and an analog signal function over a range of pressures including the predetermined pressure.

In an automobile, one of the operating conditions that is monitored is the oil pressure. In many cars, power is supplied to an electric fuel pump through a switch which is closed only upon the oil pressure reaching a predetermined minimum level. An additional sensor provides an analog signal corresponding to the oil pressure. Conventionally, these functions have been implemented with strictly electromechanical technology and with separate assemblies performing the two functions. It is therefore an object of the present invention to provide a single assembly to perform both the power switching and analog signal functions in response to oil pressure.

Many of the control functions in an automobile which were previously handled by electromechanical devices have been taken over by a microcomputer. It is therefore another object of this invention to provide a pressure transducer suitable for use with a microcomputer.

SUMMARY OF THE INVENTION

The foregoing and additional objects are attained in accordance with the principles of this invention by providing an arrangement for monitoring the pressure of a fluid in a system and providing both a switching function at a predetermined pressure and an analog signal function over a range of pressures including the predetermined pressure. The inventive arrangement comprises a housing having a chamber therein, a diaphragm sealing an end of the chamber, and means for providing fluid communication between the system and the diaphragm outside the chamber. There is also provided an actuator rod within the chamber, the actuator rod having opposed ends with a first of the ends being coupled to the diaphragm for movement in unison therewith, means for guiding the actuator rod for axial movement, and means for biasing the actuator rod toward the diaphragm. A pair of switch terminal pins are mounted on the housing and extend into the chamber and a Hall effect transducer is mounted within the chamber. A magnet is mounted on the second end of the actuator rod for movement in unison therewith, the magnet being so positioned that the distance between the magnet and the Hall effect transducer changes as the diaphragm moves. There is further provided conductive means for providing a short circuit between the pair of switch terminal pins and means for mounting the conductive means on the second end of the actuator rod so that the conductive means moves with the actuator rod as the fluid pressure increases to the predetermined pressure, whereupon the conductive means contacts the pair of switch terminal pins, the actuator rod continuing to move freely of the conductive means as the fluid pressure increases beyond the predetermined pressure.

BRIEF DESCRIPTION OF THE DRAWINGS

The foregoing will be more readily apparent upon reading the following description in conjunction with the drawings in which like elements in different figures thereof have the same reference character applied thereto and wherein.

DETAILED DESCRIPTION

Figure 1:
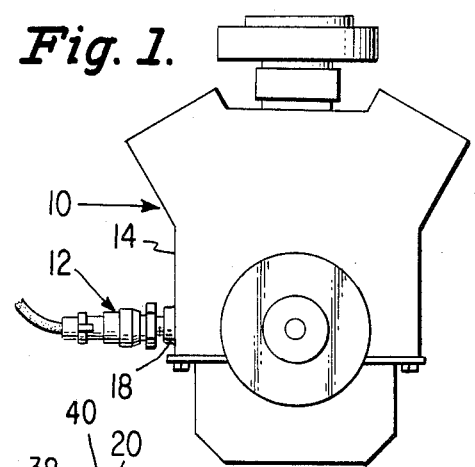
FIG. 1 depicts an arrangement constructed in accordance with the principles of this invention mounted on an automobile engine.

Referring now to the drawings, FIG. 1 depicts an automobile engine, designated generally by the reference numeral 10, in which an assembly 12 constructed in accordance with the principles of this invention is installed. The assembly 12 is screwed into the engine block 14 through an opening 16 in a boss 18 through it which it communicates with the oil lubrication system of the engine 10.

Figure 2:
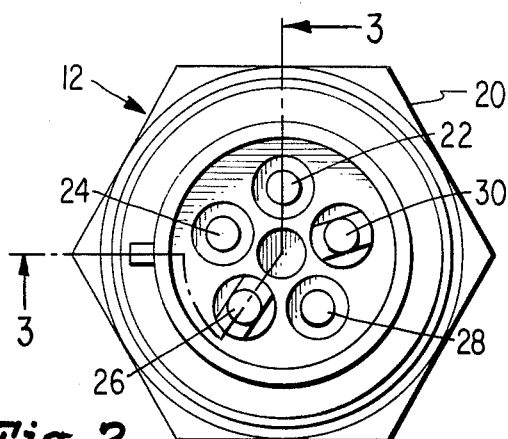
FIG. 2 is an end view of an arrangement constructed in accordance with the principles of this invention.

FIG. 2 is an end view of the assembly 12 in which is visible the hex head 20 used for installing the assembly 12 in the engine block 14 as well as the five terminals 22, 24, 26, 28 and 30 utilized for connecting the assembly 12 to external circuitry. In particular, the terminals 26 and 30 are the power switching terminals and the terminals 22, 24 and 28 are used to provide the analog signal indicative of the oil pressure.

Figure 3:
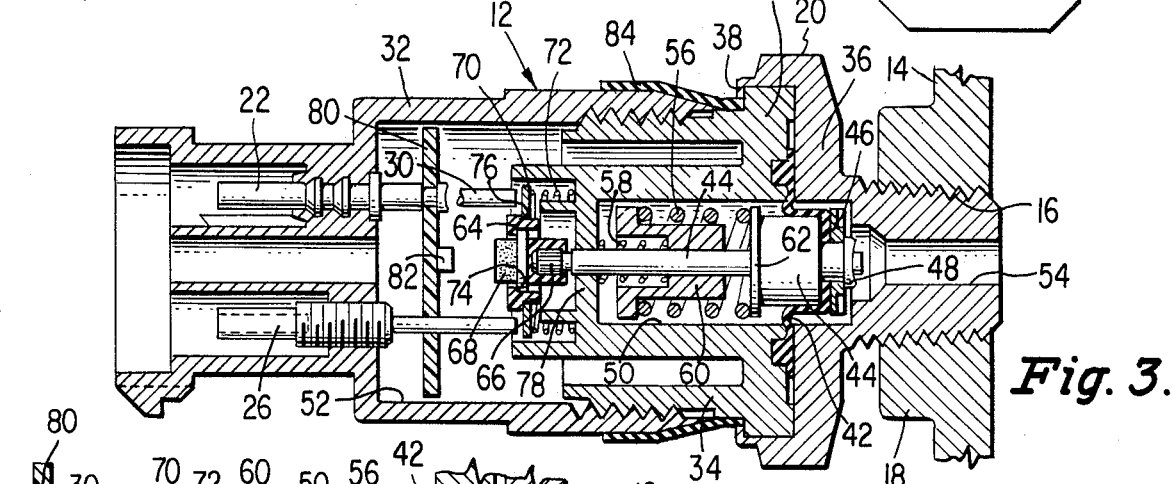
FIG. 3 is a longitudinal cross sectional view taken substantially along the line 3—3 in FIG. 2.

FIG. 3 shows a cross section of the assembly 12 with the internal components in the at-rest condition. The assembly 12 is made up of a female housing 32, a male housing 34 and a mounting adaptor 36. The mounting adaptor 36 is fastened to the male housing 34 by crimping the cylindrical wall 38 of the mounting adaptor 36 over the shoulder 40 of the male housing 34. With this operation, the circular bead portion of the rolling diaphragm 42 is compressed, providing a seal preventing any pressurized media, liquid or air, from escaping. The other area that requires a seal is where the diaphragm 42 is mounted on the actuator rod 44. This is accomplished by placing the diaphragm washer 46 over the diaphragm 42 and staking the center extension of the actuator rod 44 over the washer 46. This operation provides sufficient compression of the diaphragm 42 material, making a reliable seal between the two sides of the diaphragm 42. It is preferable to use a rolling diaphragm because such an element provides a tough and flexible seal with a unique configuration that permits relatively long actuator rod strokes while completely eliminating sliding friction.

The male housing 34 contains the diaphragm-actuator rod subassembly. This subassembly is within a chamber 50 formed within the male housing 34 and extends into a chamber 52 formed within the female housing 32. The chambers 50,52 are sealed by the diaphragm 42 and the mounting adaptor 36 is formed with a bore 54 which provides fluid communication between the lubrication system of the engine 10 and the diaphragm 42 outside the chamber 50.

The diaphragm-actuator rod subassembly includes a pair of springs 56 and 58, a spring seat 60 and a washer 62, all surrounding the actuator rod 44 and within the chamber 50. The subassembly further includes, within the chamber 52, a magnet holder 64 press fit onto the knurled end 66 of the actuator rod 44, a magnet 68, a contact washer 70 and a spring 72. The magnet 68 is inserted laterally into the magnet holder 64 and is captured by the inverted lip 74 thereof. The contact washer 70 is biased by the spring 72 against the external lip 76 of the magnet holder 64. The male housing 34 is formed with a guideway 78 for guiding the actuator rod 44 for axial movement.

The female housing 32 holds the switching elements and the analog signal circuitry. The analog signal circuitry is mounted on the printed circuit board 80 and includes a Hall effect transducer 82 mounted on the board 80, preferably along the line of movement of the magnet 68. External connections to the circuitry on the board 80 are through the terminals 22, 24 and 28, which also serve to secure the board 80 within the chamber 52. Thus, as shown in FIG. 3, the terminals 22, 24 and 28 are pressed into appropriate holes within the female housing 32, then the board 80 is mounted onto the three terminals 22, 24 and 28 and the terminal portions extending beyond the surface of the board 80 are soldered to their respective copper track on the board 80. The terminal pins 26 and 30 are externally threaded and are secured by threading into appropriate holes in the female housing 32, with their ends which extend into the chamber 52 extending through appropriate openings in the board 80.

Figure 4:
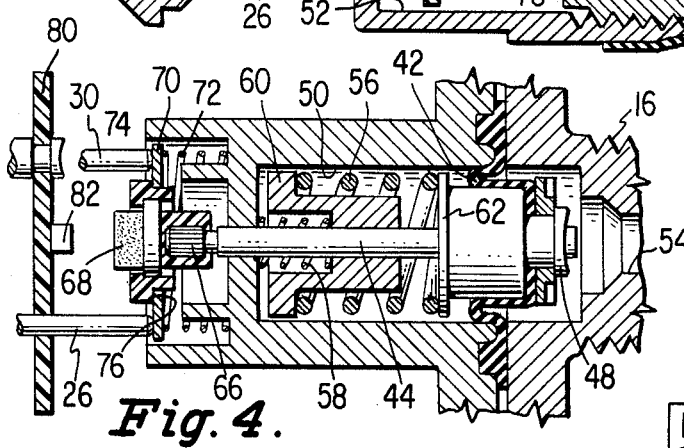
FIG. 4 is a partial view similar to FIG. 3 showing the condition of the arrangement at the predetermined pressure.
Figure 5:
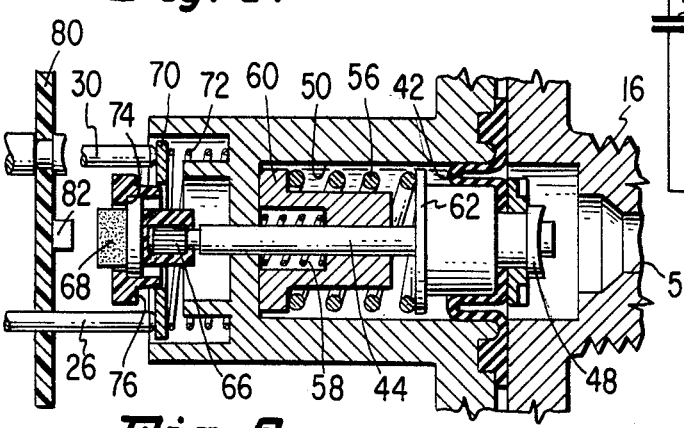
FIG. 5 is a partial view similar to FIG. 3 showing the condition of the arrangement at a pressure greater than the predetermined pressure.

FIG. 4 shows the assembly where the oil pressure has increased so as to enable the diaphragm-actuator rod subassembly to compress the spring 58 and move sufficiently that the contact washer 70 engages the terminals pins 26 and 30 to provide a conductive path therebetween. The contact force is provided by the spring 72. As shown in FIG. 5, as the oil pressure continues to increase, the spring 58 is compressed as far as will be allowed by the configuration of the spring seat 60 and the spring 56 is compressed. The magnet 68 is moved closer to the Hall effect transducer 82. The contact washer 70 is prevented from further movement by the terminal pins 26 and 30 and due to the tapered nature of the magnet holder 64, the magnet holder 64 can move beyond the washer 70.

To calibrate the assembly 12, the power switching function is adjustable by varying the extension of the terminal pins 26 and 30 into the chamber 52. This is accomplished by screwing the terminals pins 26 and 30 in or out. The air gap between the magnet 68 and the Hall effect transducer 82 may be adjusted by varying the threaded engagement between the male housing 34 and the female housing 32. After this adjustment, the relative positions between the housings 32 and 34 is maintained by means of shrink tubing 84.

Figure 6:
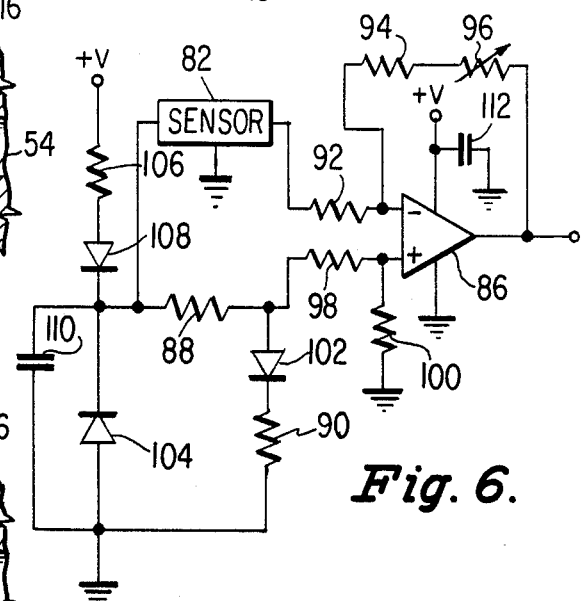
FIG. 6 is a schematic circuit diagram of illustrative circuitry for use with the assembly constructed in accordance with the principles of this invention.

FIG. 6 shows a schematic diagram of illustrative electronic circuitry mounted on the printed circuit board 80 and connected to the terminals 22, 24 and 28. This circuitry amplifies the output of the transducer (or sensor) 82. Preferably, the magnet 68 is magnetized in the direction along which it travels toward and away from the sensor 82 so that the sensor 82 operates in what is known as the unipolar head-on mode of operation. The basic equation describing the interaction of the magnetic field and current resulting in a Hall voltage ($V_H$) for a practical Hall element is:

$$V_H = K \times I_c \times B \sin \theta$$

where:
the constant K is a function of the geometry of the Hall element;
$I_c$ is the input current; and
$B \sin \theta$ is the magnetic flux density.

If the input current is held constant, then the Hall voltage will be directly proportional to the perpendicular component of the magnetic field. This output Hall voltage is usually small and requires additional electronics to achieve a useful voltage level. Illustrative electronics is shown in FIG. 6.

As shown in FIG. 6, the change in the transducer 82 voltage is fed into one input of the operational amplifier 86, the other input of which is fed with a reference voltage set by the resistors 88 and 90. The operational amplifier 86 acts like a differential amplifier which amplifies the difference of the two input signals by a gain factor set by the resistors 92, 94, and the trim pot 96. The resistors 98 and 100 are used to set the operational amplifier 86 to act as a differential amplifer and at the same time to minimize the output offset level. Therefore, by properly selecting the resistors 88, 90, 92, 94, 98, 100 and the trim pot 96, a desired operational amplifier output for a given pressure is achievable. By doing so, a range of outputs for a given range of applied pressure can be obtained. Based on this data, a graph of output voltage versus applied pressure may be plotted. Since the Hall sensor output at different magnetic flux densities is repeatable, the graph data may be entered into a computer for further processing. Therefore, by seeing the voltage output of the amplifier 86, the computer will be able to tell what the applied pressure is.

In the circuit of FIG. 6, the diode 102 is used to temperature compensate for output drifting of the sensor 82, which has a negative temperature coefficient when exposed to the south pole of the magnet 68. The zener diode 104 is used to regulate the supply for the sensor 82 as well as for the reference voltage source. The zener current is limited by the resistor 106 and the diode 108 is used to compensate for temperature drifting of the zener voltage. The bypass capacitors 110 and 112 are used for filtering and preventing oscillation in electrically noisy environments.

Accordingly, there has been disclosed an improved pressure measuring arrangement which provides both a switching function at a predetermined pressure and an analog signal function over a range of pressures including the predetermined pressure. It is understood that the above-described embodiment is merely illustrative of the application of the principles of this invention. Numerous other embodiments may be devised by those skilled in the art without departing from the spirit and scope of this invention, as defined by the appended claims.

We claim:

1. An arrangement for monitoring the pressure of a fluid in a system and providing both a switching function at a predetermined pressure and an analog signal function over a range of pressures including said predetermined pressure, said arrangement comprising:

a housing having a chamber therein;

a diaphragm sealing an end of said chamber;

means for providing fluid communication between said system and said diaphragm outside said chamber;

an actuator rod within said chamber, said actuator rod having opposed ends with a first of said ends being coupled to said diaphragm for movement in unison therewith;

means for guiding said actuator rod for axial movement;

means for biasing said actuator rod toward said diaphragm;

a pair of switch terminal pins mounted on said housing and extending into said chamber;

a Hall effect transducer mounted within said chamber;

a magnet mounted on the second end of said actuator rod for movement in unison therewith, said magnet being so positioned that the distance between said magnet and said Hall effect transducer changes as said diaphragm moves;

conductive means for providing a short circuit between said pair of switch terminal pins; and means for mounting said conductive means on the second end of said actuator rod so that said conductive means moves with said actuator rod as the fluid pressure increases to said predetermined pressure, whereupon said conductive means contacts said pair of switch terminal pins, said actuator rod continuing to move freely of said conductive means as the fluid pressure increases beyond said predetermined pressure.

2. The arrangement according to claim 1 further including means for adjusting said predetermined pressure.

3. The arrangement according to claim 2 wherein said adjusting means includes means for varying the distance said terminal pins extend into said chamber.

4. The arrangement according to claim 3 wherein said varying means includes the combination of external threads on said terminal pins and internally threaded bores in said housing.

5. The arrangement according to claim 1 wherein said conductive means comprises a washer and said mounting means includes:

a collar fixedly secured to said actuator rod second end, said collar having an outwardly extending lip at the end remote from said diaphragm, said washer surrounding said collar between said lip and said diaphragm; and means for biasing said washer away from said diaphragm and toward said lip.

6. The arrangement according to claim 1 wherein the line of movement of said magnet passes through said Hall effect transducer.

7. The arrangement according to claim 6 wherein said magnet is magnetized along its line of movement.

* * * * *